UNITED STATES PATENT OFFICE.

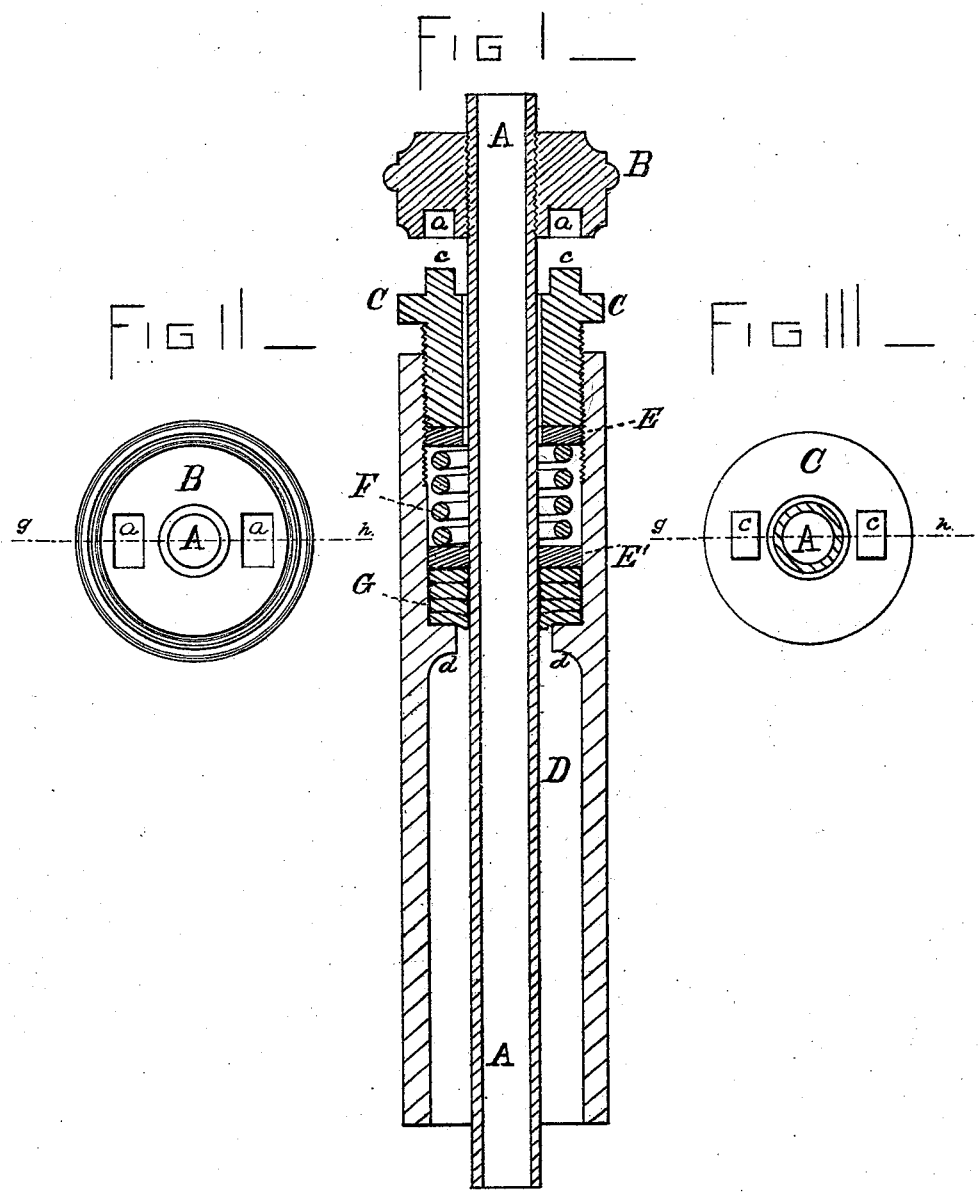

ROBERT CORNELIUS, OF PHILADELPHIA, PENNSYLVANIA.

IMPROVEMENT IN CHANDELIERS.

Specification forming part of Letters Patent No. 148,285, dated March 10, 1874; application filed December 19, 1873.

*To all whom it may concern:*

Be it known that I, ROBERT CORNELIUS, of the city and county of Philadelphia, in the State of Pennsylvania, have invented a new and useful Adjustable Packing for Slide-Chandeliers; and I do hereby declare the following to be a full, clear, and precise description thereof, which will enable those skilled in the art to which it appertains to make and use the same, reference being had to the accompanying drawing which forms a part of this specification, and in which—

Figure 1 is a vertical section of the main pipe of a slide-chandelier taken on the line *g h* of Figs. 2 and 3, showing in details my improved packing and appliances. Fig. 2 is a bottom view of the lug-box casting B, showing the recesses *a a*, into which the lugs *c c* on the screw-cover C take; and Fig. 3 is a top view of the screw-cover C, showing the lugs *c c*.

Similar letters of reference indicate corresponding parts in all the figures.

My invention aims to produce an effective packing for the sliding pipes of slide-chandeliers—a packing combining at once simplicity, durability, and general excellence, and capable, also, of being tightened and compressed without taking the fixture down or apart. Those now in use, though possibly effective for a time, soon lose this quality and become worse than useless, requiring constant renewal. The principle of my device is that of a constant tension of pressure produced by a spiral spring surrounding the sliding pipe, and constantly acting by expansive pressure upon leather or other suitable packing material; and that of an arrangement whereby the packing may be tightened, if required, without necessitating the taking down or apart of the chandelier.

Having thus described its principle, the construction of my arrangement is as follows:

A (and I now refer more especially to Fig. 1) is the sliding pipe of a chandelier. D is the surrounding main pipe, of greater diameter but concentric with the former. The inner side of the upper extremity of this main pipe D is cut with a screw-thread for a considerable distance down. Screwing into this thread is a cylindrical stopper, which I call a screw-cover, C, which is provided with little square projections or lugs *c c*, whose function is hereinafter to be more fully described. Through the hollow center of this screw-cover passes the sliding pipe A. Now, it will be readily understood that this cover can be screwed into pipe D as far as desired. Somewhat farther down inside of pipe D is a collar or projection, turned, soldered, or in any way formed within the pipe. Upon this collar rest, surrounding the sliding pipe, several rings of leather, or other substance suitable for packing. Over them, and also surrounding the sliding pipe, is a spiral spring, F, and two spring-collars, E E', to which the ends of the spring are fastened. Above this spring is the screw-cover. Now, it will be seen that by screwing down into the main pipe the screw-cover C the spiral spring is compressed to any extent desired, and by the expansive action of the spiral the packing G is in turn compressed, flattened out, and caused to impinge very closely upon the sliding pipe A, forming a perfect gas-tight packing around said sliding pipe. Formed around the upper part of the sliding pipe is a casting, B, which I call the lug-box, which is provided with two cubical recesses, *a a*. This casting may be concealed, if desired, the main pipe passing around it, or may be fashioned outwardly into an ornament of the chandelier, or be a pulley-box, or the like. When, by chance or time, the packing may have become loosened, all that is requisite for its tightening is simply to draw down the sliding pipe and casting until the lugs *c c* on the screw-cover C take into the recesses *a a* in the casting, and then rotate the sliding pipe gently to the left, whereby, as will be readily comprehended, the spring and packing are more tightly compressed.

This device I contemplate applying to all kinds of slide-chandeliers.

Having thus fully described my invention, what I claim, and desire to secure by Letters Patent of the United States, is—

The combination of the casting B and its recesses *a a* with the lugged projections *c c* on the screw-cover C, and with the spiral spring F, packing G, and pipes R and D, operating for the tightening of the packing, substantially as described.

ROBERT CORNELIUS.

Witnesses:
J. BONSALL TAYLOR,
W. H. ADDICKS.